United States Patent
Katada

(10) Patent No.: US 10,538,641 B2
(45) Date of Patent: Jan. 21, 2020

(54) CROSSLINKABLE RUBBER COMPOSITION AND CROSSLINKED RUBBER

(71) Applicant: ZEON CORPORATION, Chiyoda-ku, Tokyo (JP)

(72) Inventor: Arinobu Katada, Tokyo (JP)

(73) Assignee: ZEON CORPORATION, Chiyoda-ku, Tokyo (JP)

( * ) Notice: Subject to any disclaimer, the term of this patent is extended or adjusted under 35 U.S.C. 154(b) by 55 days.

(21) Appl. No.: 15/326,544

(22) PCT Filed: Jul. 22, 2015

(86) PCT No.: PCT/JP2015/003676
§ 371 (c)(1),
(2) Date: Jan. 16, 2017

(87) PCT Pub. No.: WO2016/013218
PCT Pub. Date: Jan. 28, 2016

(65) Prior Publication Data
US 2017/0204244 A1 Jul. 20, 2017

(30) Foreign Application Priority Data
Jul. 25, 2014 (JP) ................. 2014-152283

(51) Int. Cl.
| | |
|---|---|
| C08K 3/04 | (2006.01) |
| C08K 5/17 | (2006.01) |
| B82Y 30/00 | (2011.01) |
| C08L 9/02 | (2006.01) |
| C08L 15/00 | (2006.01) |
| C08K 5/18 | (2006.01) |
| C08K 5/205 | (2006.01) |
| C08K 5/00 | (2006.01) |
| C08K 3/013 | (2018.01) |

(52) U.S. Cl.
CPC ............. *C08K 3/04* (2013.01); *C08K 3/041* (2017.05); *C08K 5/17* (2013.01); *C08K 5/18* (2013.01); *C08K 5/205* (2013.01); *C08L 9/02* (2013.01); *C08L 15/005* (2013.01); *B82Y 30/00* (2013.01); *C08K 3/013* (2018.01); *C08K 5/0025* (2013.01); *C08K 2201/006* (2013.01); *C08K 2201/011* (2013.01); *Y10S 977/75* (2013.01); *Y10S 977/752* (2013.01)

(58) Field of Classification Search
CPC combination set(s) only.
See application file for complete search history.

(56) References Cited

U.S. PATENT DOCUMENTS

| | | | | |
|---|---|---|---|---|
| 6,657,014 | B1 | 12/2003 | Mori et al. | |
| 9,593,227 | B2 * | 3/2017 | Shigeta | C08K 3/04 |
| 2011/0190441 | A1 | 8/2011 | Brandau et al. | |
| 2011/0301300 | A1 * | 12/2011 | Iizuka | C08C 19/02 |
| | | | | 525/328.9 |
| 2012/0214945 | A1 * | 8/2012 | Emori | C08J 3/226 |
| | | | | 525/225 |
| 2013/0261246 | A1 * | 10/2013 | Ong | C08K 7/24 |
| | | | | 524/495 |

FOREIGN PATENT DOCUMENTS

| | | | | |
|---|---|---|---|---|
| CN | 1554693 | A | 12/2004 | |
| CN | 101613495 | A | 12/2009 | |
| EP | 1787955 | A1 | 5/2007 | |
| EP | 2138535 | A1 * | 12/2009 | C08L 9/02 |
| EP | 2316860 | A1 | 5/2011 | |
| JP | 2008163074 | A | 7/2008 | |
| JP | 2010001475 | A | 1/2010 | |
| WO | 0114469 | A1 | 3/2001 | |
| WO | 2006011655 | A1 | 2/2006 | |
| WO | 2011117194 | A1 | 9/2011 | |
| WO | WO-2014097626 | A1 * | 6/2014 | C08K 3/04 |

OTHER PUBLICATIONS

Oct. 20, 2015, International Search Report issued in the International Patent Application No. PCT/JP2015/003676.
Feb. 12, 2018, the Extended European Search Report issued by the European Patent Office in the corresponding European Patent Application No. 15824034.1.
Jan. 31, 2017, International Preliminary Report on Patentability issued in the International Patent Application No. PCT/JP2015/003676.

* cited by examiner

*Primary Examiner* — Nicole M. Buie-Hatcher
(74) *Attorney, Agent, or Firm* — Kenja IP Law PC

(57) ABSTRACT

Provided is a crosslinked rubber having excellent workability and heat resistance, and a crosslinkable rubber composition that can be used to form the crosslinked rubber. The crosslinkable rubber composition contains: a rubber including a carboxyl group-containing ethylenically unsaturated monomer unit; an amine-based crosslinking agent having a melting point of at least 50° C. and no higher than 180° C.; and one or more carbon nanotubes. The crosslinked rubber is obtainable through crosslinking of the crosslinkable rubber composition. The carbon nanotubes preferably have a BET specific surface area of from 600 $m^2/g$ to 2,000 $m^2/g$.

4 Claims, No Drawings

CROSSLINKABLE RUBBER COMPOSITION AND CROSSLINKED RUBBER

TECHNICAL FIELD

The present disclosure relates to a crosslinkable rubber composition and a crosslinked rubber, and, in particular, relates to a crosslinkable rubber composition that contains carbon nanotubes and a crosslinked rubber obtained through crosslinking of this crosslinkable rubber composition.

BACKGROUND

In recent years, composite materials in which carbon nanotubes (hereinafter, also referred to as "CNTs") are compounded with an elastomer, such as a rubber, have been attracting interest as materials that have excellent heat resistance and mechanical properties.

For example, PTL 1 discloses, as a composite material having excellent heat resistance and mechanical properties, a crosslinked rubber that is obtained through crosslinking of a crosslinkable rubber composition containing a hydrogenated carboxylated nitrile rubber, a crosslinking agent formed by a peroxide, and CNTs.

CITATION LIST

Patent Literature

PTL 1: JP 2010-1475 A

SUMMARY

Technical Problem

However, with regards to conventional crosslinked rubbers such as described above, there is room for improvement in terms of further improving heat resistance. In particular, a crosslinked rubber used as a composite material is also required to have high workability and there is room for improvement upon conventional crosslinked rubbers such as described above in terms of further improving heat resistance while also ensuring workability.

An objective of the present disclosure is to provide is a crosslinked rubber having excellent workability and heat resistance, and a crosslinkable rubber composition that can be used to form the crosslinked rubber.

Solution to Problem

The inventor conducted diligent investigation in order to achieve the objective described above. Through this investigation, the inventor discovered that a crosslinked rubber obtained through crosslinking of a crosslinkable rubber composition containing a rubber including a prescribed monomer unit, an amine-based crosslinking agent having a prescribed melting point, and one or more carbon nanotubes has excellent workability and heat resistance. This discovery led to the present disclosure.

Specifically, the present disclosure aims to advantageously solve the problems described above by disclosing a crosslinkable rubber composition comprising: a rubber including a carboxyl group-containing ethylenically unsaturated monomer unit; an amine-based crosslinking agent having a melting point of at least 50° C. and no higher than 180° C.; and one or more carbon nanotubes. A crosslinkable rubber composition such as described above that contains a rubber including a carboxyl group-containing ethylenically unsaturated monomer unit, an amine-based crosslinking agent having a melting point of at least 50° C. and no higher than 180° C., and one or more carbon nanotubes can be crosslinked to obtain a crosslinked rubber having excellent workability and heat resistance.

As used in this disclosure, the phrase "including a monomer unit" means that "a polymer (rubber) obtained with the monomer includes a structural unit derived from the monomer".

In the presently disclosed crosslinkable rubber composition, the carbon nanotubes preferably have a BET specific surface area of at least 600 $m^2/g$ and no greater than 2,000 $m^2/g$. When carbon nanotubes having a BET specific surface area of at least 600 $m^2/g$ and no greater than 2,000 $m^2/g$ are used, the heat resistance of the crosslinked rubber can be further improved while ensuring workability.

The term "BET specific surface area" is used in the present disclosure to refer to a nitrogen adsorption specific surface area that is measured by the BET method.

Moreover, the present disclosure aims to advantageously solve the problems described above by disclosing a crosslinked rubber obtainable through crosslinking of the crosslinkable rubber composition described above. The crosslinked rubber obtained through crosslinking of the crosslinkable rubber composition described above has both excellent workability and excellent heat resistance.

The presently disclosed crosslinked rubber preferably has a flow temperature Tf of at least 330° C. and a hardness of at least 20 and no greater than 95. Sufficiently high heat resistance can be obtained when the flow temperature Tf is at least 330° C. Moreover, the crosslinked rubber can act as an elastic body and sufficient workability can be ensured when the hardness is at least 20 and no greater than 95.

The term "flow temperature Tf" is used in the present disclosure to refer to a flow temperature determined by thermomechanical analysis (TMA). Moreover, the term "hardness" is used in the present disclosure to refer to type A durometer hardness in accordance with JIS K6253.

Advantageous Effect

According to the present disclosure, it is possible to provide a crosslinked rubber having excellent workability and heat resistance, and a crosslinkable rubber composition that can be used to form the crosslinked rubber.

DETAILED DESCRIPTION

The following provides a detailed description of an embodiment of the present disclosure.

The presently disclosed crosslinkable rubber composition is a rubber composition that is capable of being crosslinked and that can be used in production of the presently disclosed crosslinked rubber. The presently disclosed crosslinked rubber is a crosslinked product that is obtainable through crosslinking of the presently disclosed crosslinkable rubber composition, and has excellent workability and heat resistance. The presently disclosed crosslinked rubber can be used for various applications such as belts, hoses, gaskets, packing, oil seals, and so forth, without any specific limitations.

(Crosslinkable Rubber Composition)

A crosslinkable rubber composition according to an embodiment of the present disclosure contains a rubber including a carboxyl group-containing ethylenically unsaturated monomer unit, an amine-based crosslinking agent having a melting point of at least 50° C. and no higher than 180° C., and one or more carbon nanotubes. As a result of the crosslinkable rubber composition according to the embodiment of the present disclosure containing a rubber including the prescribed monomer unit, an amine-based crosslinking agent having the prescribed melting point, and one or more carbon nanotubes, a crosslinked rubber obtained through crosslinking of this crosslinkable rubber composition has excellent workability and heat resistance. The crosslinkable rubber composition according to the embodiment of the present disclosure may further contain, besides the components described above, compounding agents that are normally used in the field of rubber processing.

<Rubber>

The crosslinkable rubber composition is required to contain at least the rubber including the carboxyl group-containing ethylenically unsaturated monomer unit as a rubber component. The rubber including the carboxyl group-containing ethylenically unsaturated monomer unit has excellent crosslinking reactivity with the amine-based crosslinking agent. Accordingly, when the rubber including the carboxyl group-containing ethylenically unsaturated monomer unit is used as the rubber component, a crosslinking reaction with the amine-based crosslinking agent proceeds favorably and heat resistance of the resultant crosslinked rubber is sufficiently raised.

However, note that besides the rubber including the carboxyl group-containing ethylenically unsaturated monomer unit, the crosslinkable rubber composition may further contain a rubber that does not include a carboxyl group-containing ethylenically unsaturated monomer unit.

[Rubber Including Carboxyl Group-Containing Ethylenically Unsaturated Monomer Unit]

Herein, the rubber including the carboxyl group-containing ethylenically unsaturated monomer unit may be any synthetic rubber that includes, in the rubber, a structural unit derived from a carboxyl group-containing ethylenically unsaturated monomer.

No specific limitations are placed on carboxyl group-containing ethylenically unsaturated monomers that can be used to prepare the rubber including the carboxyl group-containing ethylenically unsaturated monomer unit and ethylenically unsaturated monomers containing at least one carboxyl group may be used. Specific examples of carboxyl group-containing ethylenically unsaturated monomers that can be used include carboxylic acid monomers such as acrylic acid, methacrylic acid, ethacrylic acid (2-ethylacrylic acid), itaconic acid, maleic acid, fumaric acid, and citraconic acid; and butenedioic acid monoalkyl ester monomers such as monomethyl maleate, monoethyl maleate, mono-n-butyl maleate, monomethyl fumarate, monoethyl fumarate, and mono-n-butyl fumarate. Note that the carboxyl group may be a carboxylic anhydride group. Specific examples of carboxylic anhydride monomers that are carboxylic anhydride group-containing ethylenically unsaturated monomers include maleic anhydride and citraconic anhydride. Among the examples given above, the carboxyl group-containing ethylenically unsaturated monomer is preferably a butenedioic acid monoalkyl ester monomer and, in particular, is more preferably a butenedioic acid monoalkyl ester including an alkyl group having a carbon number of 1-4 such as monoethyl maleate, mono-n-butyl maleate, monomethyl fumarate, monoethyl fumarate, or mono-n-butyl fumarate.

Any one of such carboxyl group-containing ethylenically unsaturated monomers may be used individually, or any two or more of such carboxyl group-containing ethylenically unsaturated monomers may be used in combination.

From a viewpoint of heat resistance of the crosslinked rubber obtained through crosslinking of the crosslinkable rubber composition, it is preferable that the rubber including the carboxyl group-containing ethylenically unsaturated monomer unit is a nitrile rubber synthesized using the carboxyl group-containing ethylenically unsaturated monomer described above (i.e., a carboxylated nitrile rubber), a hydrogenated nitrile rubber synthesized using the carboxyl group-containing ethylenically unsaturated monomer described above (i.e., a hydrogenated carboxylated nitrile rubber), or an acrylic rubber synthesized using the carboxyl group-containing ethylenically unsaturated monomer described above (i.e., a carboxylated acrylic rubber). Among these rubbers, the rubber including the carboxyl group-containing ethylenically unsaturated monomer unit is more preferably a hydrogenated carboxylated nitrile rubber or a carboxylated acrylic rubber, and is even more preferably a hydrogenated carboxylated nitrile rubber from a viewpoint of further improving heat resistance of the crosslinked rubber.

Any one of such rubbers may be used individually, or any two or more of such rubbers may be used in combination.

[Carboxylated Nitrile Rubber]

The carboxylated nitrile rubber that may be compounded into the crosslinkable rubber composition is, for example, a nitrile rubber that includes an $\alpha,\beta$-ethylenically unsaturated nitrile monomer unit, a diene monomer unit, and a carboxyl group-containing ethylenically unsaturated monomer unit, and that optionally further includes other monomer units that are copolymerizable with monomers used to form the preceding monomer units.

Examples of $\alpha,\beta$-ethylenically unsaturated nitrile monomers that can be used to form the $\alpha,\beta$-ethylenically unsaturated nitrile monomer unit include, but are not specifically limited to, $\alpha,\beta$-ethylenically unsaturated nitrile compounds containing a nitrile group such as acrylonitrile; $\alpha$-halogenoacrylonitriles, examples of which include $\alpha$-chloroacrylonitrile and $\alpha$-bromoacrylonitrile; and $\alpha$-alkylacrylonitriles, examples of which include methacrylonitrile. Among these monomers, acrylonitrile and methacrylonitrile are preferable.

Any one of such monomers may be used individually, or any two or more of such monomers may be used in combination.

The content of the $\alpha,\beta$-ethylenically unsaturated nitrile monomer unit in the carboxylated nitrile rubber is preferably at least 5 mass %, more preferably at least 8 mass %, and even more preferably at least 10 mass %, and is preferably no greater than 60 mass %, more preferably no greater than 40 mass %, and even more preferably no greater than 35 mass %. As a result of the content of the $\alpha,\beta$-ethylenically unsaturated nitrile monomer unit being in the aforementioned range, the crosslinked rubber can be provided with excellent physical properties (for example, oil resistance and cold resistance).

Examples of diene monomers that can be used to form the diene monomer unit include conjugated diene monomers having a carbon number of at least 4 such as 1,3-butadiene, isoprene, 2,3-dimethyl-1,3-butadiene, and 1,3-pentadiene; and non-conjugated diene monomers having a carbon number of preferably 5-12 such as 1,4-pentadiene and 1,4-hexadiene. Among such diene monomers, conjugated diene monomers are preferable, and 1,3-butadiene is more preferable.

The content of the diene monomer unit in the carboxylated nitrile rubber is preferably at least 20 mass %, more preferably at least 25 mass %, even more preferably at least 30 mass %, and particularly preferably at least 35 mass %, and is preferably no greater than 89.5 mass %, more preferably no greater than 81 mass %, even more preferably no greater than 74.5 mass %, and particularly preferably no greater than 69.5 mass %. As a result of the content of the diene monomer unit being in the aforementioned range, the crosslinked rubber can be provided with excellent physical properties (for example, rubber elasticity, heat resistance, oil resistance, and chemical stability).

Examples of carboxyl group-containing ethylenically unsaturated monomers that can be used to form the carboxyl group-containing ethylenically unsaturated monomer unit include, but are not specifically limited to, the same carboxyl group-containing ethylenically unsaturated monomers as previously described. Among such monomers, the carboxyl group-containing ethylenically unsaturated monomer used to form the carboxyl group-containing ethylenically unsaturated monomer unit in the carboxylated nitrile rubber is preferably monomethyl maleate, monoethyl maleate, or mono-n-butyl maleate, and is more preferably mono-n-butyl maleate from a viewpoint of dispersibility of the CNTs described further below and crosslinkability.

The content of the carboxyl group-containing ethylenically unsaturated monomer unit in the carboxylated nitrile rubber is preferably at least 0.1 mass %, more preferably at least 0.5 mass %, and even more preferably at least 1 mass %, and is preferably no greater than 20 mass %, more preferably no greater than 10 mass %, and even more preferably no greater than 8 mass %. If the content of the carboxyl group-containing ethylenically unsaturated monomer unit is too small, the crosslinking reaction with the amine-based crosslinking agent does not occur to a sufficient extent and, as a result, it is difficult to sufficiently improve heat resistance of the crosslinked rubber. Conversely, if the content of the carboxyl group-containing ethylenically unsaturated monomer unit is too large, the resultant crosslinked rubber may become excessively hard and workability of the crosslinked rubber may be reduced.

Examples of other monomers that can be used to form other monomer units include known monomers that are copolymerizable with the α,β-ethylenically unsaturated nitrile monomer unit, the diene monomer unit, and the carboxyl group-containing ethylenically unsaturated monomer unit. Specific examples of other monomers that can be used include esters of monovalent alcohols and monovalent (meth)acrylic acids (alkyl (meth)acrylates) such as methyl (meth)acrylate, ethyl (meth)acrylate, n-propyl (meth)acrylate, n-butyl (meth)acrylate, isopropyl (meth)acrylate, isobutyl (meth)acrylate, n-hexyl (meth)acrylate, 2-ethylhexyl (meth)acrylate, and cyclohexyl (meth)acrylate; aromatic vinyl monomers such as styrene, α-methylstyrene, and vinylpyridine; fluorine-containing vinyl monomers such as fluoroethyl vinyl ether, fluoropropyl vinyl ether, o-trifluoromethylstyrene, vinyl pentafluorobenzoate, difluoroethylene, and tetrafluoro ethylene; and copolymerizable anti-aging agents such as N-(4-anilinophenyl)acrylamide, N-(4-anilinophenyl)methacrylamide, N-(4-anilinophenyl) cinnamamide, N-(4-anilinophenyl)crotonamide, N-phenyl-4-(3-vinylbenzyloxy)aniline, and N-phenyl-4-(4-vinylbenzyloxy)aniline.

In the present specification, "(meth)acryl" is used to indicate "acryl" and/or "methacryl".

The content of these other monomer units in the carboxylated nitrile rubber is an amount that does not substantially impair the effects disclosed herein and is normally less than 50 mass %, preferably from 0 mass % to 10 mass %, and more preferably from 0 mass % to 5 mass %.

The polymer Mooney viscosity ($ML_{1-4}$, 100° C.) of the carboxylated nitrile rubber is preferably at least 15 and no greater than 200, more preferably at least 15 and no greater than 150, and even more preferably at least 15 and no greater than 100. An excessively small Mooney viscosity may result in the crosslinked rubber having poor mechanical strength. Conversely, an excessively large Mooney viscosity may result in the crosslinked rubber having poor workability.

The carboxylated nitrile rubber can be obtained through polymerization of a monomer mixture that contains the monomers described above. The mode of polymerization reaction may, for example, be any of emulsion polymerization, suspension polymerization, bulk polymerization, and solution polymerization. However, emulsion polymerization at normal pressure is preferable, for example, in terms of ease of controlling the polymerization reaction. The emulsion polymerization may be carried out by a batch process, a semibatch process, or a continuous process.

[Hydrogenated Carboxylated Nitrile Rubber]

The hydrogenated carboxylated nitrile rubber that may be compounded into the crosslinkable rubber composition is, for example, a hydrogenated rubber obtained through hydrogenation of the diene monomer unit in the carboxylated nitrile rubber described above by a known method. In the hydrogenated carboxylated nitrile rubber obtained through hydrogenation of the above-described carboxylated nitrile rubber by a known method, a portion of or all diene monomer units in the carboxylated nitrile rubber are hydrogenated to form an α-olefin monomer. In other words, the hydrogenated carboxylated nitrile rubber that may be compounded into the crosslinkable rubber composition includes an α,β-ethylenically unsaturated nitrile monomer unit, a diene monomer unit and/or an α-olefin monomer unit, and a carboxyl group-containing ethylenically unsaturated monomer unit, and may optionally further include other monomer units that are copolymerizable with monomers used to form the preceding monomer units.

Selective hydrogenation of the diene monomer unit in the above-described carboxylated nitrile rubber can, for example, be carried out by a commonly known method such as an oil-layer hydrogenation method or a water-layer hydrogenation method.

The iodine value of the hydrogenated carboxylated nitrile rubber is preferably no greater than 120, more preferably no greater than 80, even more preferably no greater than 25, and particularly preferably no greater than 15. An excessively large iodine value for the hydrogenated carboxylated nitrile rubber may lead to reduction of physical properties of the crosslinked rubber (for example, heat stability and ozone resistance).

The polymer Mooney viscosity ($ML_{1+4}$, 100° C.) of the hydrogenated carboxylated nitrile rubber is preferably at least 15 and no greater than 200, more preferably at least 15 and no greater than 150, and even more preferably at least 15 and no greater than 100. An excessively small Mooney viscosity may result in the crosslinked rubber having poor mechanical strength. Conversely, an excessively large Mooney viscosity may result in the crosslinked rubber having poor workability.

[Carboxylated Acrylic Rubber]

The carboxylated acrylic rubber that may be compounded into the crosslinkable rubber composition is, for example, an acrylic rubber that includes a (meth)acrylic acid ester monomer unit and a carboxyl group-containing ethylenically unsaturated monomer unit, and that optionally further includes other monomer units that are copolymerizable with monomers used to form the preceding monomer units.

Examples of (meth)acrylic acid ester monomers that can be used to form the (meth)acrylic acid ester monomer unit, which is a main component of the carboxylated acrylic rubber, include, but are not specifically limited to, alkyl (meth)acrylate monomers and alkoxyalkyl (meth)acrylate monomers.

Although no specific limitations are placed on alkyl (meth)acrylate monomers that can be used, an ester of an alkanol having a carbon number of 1-8 and (meth)acrylic acid is preferable. Specific examples of alkyl (meth)acrylate monomers that can be used include methyl (meth)acrylate, ethyl (meth)acrylate, n-propyl (meth)acrylate, n-butyl (meth)acrylate, isopropyl (meth)acrylate, isobutyl (meth)acrylate, n-hexyl (meth)acrylate, 2-ethylhexyl (meth)acrylate, and cyclohexyl (meth)acrylate. Among these alkyl (meth)acrylate monomers, ethyl (meth)acrylate and n-butyl (meth)acrylate are preferable, and ethyl acrylate and n-butyl acrylate are particularly preferable. One of such alkyl (meth)acrylate monomers may be used individually, or two or more of such alkyl (meth)acrylate monomers may be used in combination.

Although no specific limitations are placed on alkoxyalkyl (meth)acrylate monomers that can be used, an ester of an alkoxyalkyl alcohol having a carbon number of 2-8 and (meth)acrylic acid is preferable. Specific examples include methoxymethyl (meth)acrylate, ethoxymethyl (meth)acrylate, 2-methoxyethyl (meth)acrylate, 2-ethoxyethyl (meth)acrylate, 2-propoxyethyl (meth)acrylate, 2-butoxyethyl (meth)acrylate, 3-methoxypropyl (meth)acrylate, and 4-methoxybutyl (meth)acrylate. Among these alkoxyalkyl (meth)acrylate monomers, 2-ethoxyethyl (meth)acrylate and 2-methoxyethyl (meth)acrylate are preferable, and 2-ethoxyethyl acrylate and 2-methoxyethyl acrylate are particularly preferable. One of such alkoxyalkyl (meth)acrylate monomers may be used individually, or two or more of such alkoxyalkyl (meth)acrylate monomers may be used in combination.

The content of the (meth)acrylic acid ester monomer unit in the carboxylated acrylic rubber is normally at least 50 mass %, preferably at least 80 mass %, more preferably at least 90 mass %, and even more preferably at least 92 mass %, and is preferably no greater than 99.9 mass %, more preferably no greater than 99.5 mass %, and even more preferably no greater than 99 mass %. If the content of the (meth)acrylic acid ester monomer unit is too small, heat resistance and the like of the crosslinked rubber may be reduced.

Furthermore, the percentage of (meth)acrylate acid ester monomer units that are alkyl (meth)acrylate monomer units is preferably from 30 mass % to 100 mass %.

Examples of carboxyl group-containing ethylenically unsaturated monomers that can be used to form the carboxyl group-containing ethylenically unsaturated monomer unit include, but are not specifically limited to, the same carboxyl group-containing ethylenically unsaturated monomers as previously described. Among such monomers, the carboxyl group-containing ethylenically unsaturated monomer used to form the carboxyl group-containing ethylenically unsaturated monomer unit in the carboxylated acrylic rubber is preferably monomethyl fumarate, monoethyl fumarate, or mono-n-butyl fumarate, and is more preferably monomethyl fumarate from a viewpoint of dispersibility of the CNTs described further below and crosslinkability.

The content of the carboxyl group-containing ethylenically unsaturated monomer unit in the carboxylated acrylic rubber is preferably at least 0.1 mass %, more preferably at least 0.5 mass %, and even more preferably at least 1 mass %, and is preferably no greater than 20 mass %, more preferably no greater than 10 mass %, and even more preferably no greater than 8 mass %. If the content of the carboxyl group-containing ethylenically unsaturated monomer unit is too small, the crosslinking reaction with the amine-based crosslinking agent does not occur to a sufficient extent and, as a result, it is difficult to sufficiently improve heat resistance of the crosslinked rubber. Conversely, if the content of the carboxyl group-containing ethylenically unsaturated monomer unit is too large, the resultant crosslinked rubber may become excessively hard and workability of the crosslinked rubber may be reduced.

Examples of monomers that can be used to form other monomer units include known monomers that are copolymerizable with the (meth)acrylic acid ester monomer and the carboxyl group-containing ethylenically unsaturated monomer. Specific examples of other monomers that can be used include acrylonitrile, methacrylonitrile, ethylene, propylene, vinyl chloride, vinylidene chloride, vinyl acetate, ethyl vinyl ether, butyl vinyl ether, styrene, α-methylstyrene, isoprene, butadiene, chloroprene, piperylene, dicyclopentadiene, norbornene, ethylidene norbornene, hexadiene, norbornadiene, divinyl benzene, ethylene glycol diacrylate, propylene glycol diacrylate, ethylene glycol dimethacrylate, and propylene glycol dimethacrylate.

It should be noted that polyfunctional (meth)acrylates such as ethylene glycol diacrylate, propylene glycol diacrylate, ethylene glycol dimethacrylate, and propylene glycol dimethacrylate are not considered to be included among the (meth)acrylic acid ester monomers described above.

The content of these other monomer units in the carboxylated acrylic rubber is an amount that does not substantially impair the effects disclosed herein and is normally less than 50 mass %, preferably from 0 mass % to 10 mass %, and more preferably from 0 mass % to 5 mass %.

The polymer Mooney viscosity ($ML_{1-4}$, 100° C.) of the carboxylated acrylic rubber is preferably at least 10 and no greater than 80, and more preferably at least 20 and no greater than 70. An excessively small Mooney viscosity may result in the crosslinked rubber having poor mechanical strength. Conversely, an excessively large Mooney viscosity may result in the crosslinked rubber having poor workability.

The carboxylated acrylic rubber can be obtained through polymerization of a monomer mixture that contains the monomers described above. The mode of polymerization reaction may, for example, be any of emulsion polymerization, suspension polymerization, bulk polymerization, and solution polymerization. However, emulsion polymerization at normal pressure is preferable, for example, in terms of ease of controlling the polymerization reaction. The emulsion polymerization may be carried out by a batch process, a semibatch process, or a continuous process.

<Amine-Based Crosslinking Agent>

When the crosslinked rubber is obtained through crosslinking of the crosslinkable rubber composition, the amine-based crosslinking agent reacts with carboxyl groups and the like in the rubber to form a crosslinked structure in the crosslinked rubber such that heat resistance of the crosslinked rubber is favorably improved. Examples of amine-based crosslinking agents that can be used include, but are not specifically limited to, poly amine-based crosslinking agents such as (1) a compound including at least two amino groups and (2) a compound that is converted to a form that includes at least two amino groups during crosslinking. Specific examples of amine-based crosslinking agents that can be used include polyamine-based crosslinking agents in which a plurality of hydrogen atoms of an aliphatic hydrocarbon or an aromatic hydrocarbon are each substituted with an amino group or a hydrazide structure (structure represented by —$CONHNH_2$, where CO represents a carbonyl group).

The amine-based crosslinking agent used in the crosslinkable rubber composition is required to have a melting point of at least 50° C. and no higher than 180° C. The melting point of the amine-based crosslinking agent is preferably at least 80° C., more preferably at least 100° C., even more preferably at least 140° C., and particularly preferably at least 150° C., and is preferably no higher than 170° C., and more preferably no higher than 160° C. If an amine-based crosslinking agent having a melting point of higher than 180° C. is used, it is difficult to cause a crosslinking reaction to proceed between the amine-based crosslinking agent and carboxyl groups and the like in the rubber, and it is difficult to improve heat resistance of the crosslinked rubber. In general, it is necessary to apply relatively high shear force to the crosslinkable rubber composition during preparation thereof such as to knead the rubber, the CNTs, and so forth in order to favorably disperse the CNTs in the crosslinkable rubber composition. This kneading through application of high shear force causes generation of heat in the crosslinkable rubber composition. Accordingly, if an amine-based crosslinking agent having a melting point of lower than 50° C. is used, a crosslinking reaction proceeds during preparation of the crosslinkable rubber composition (particularly during kneading) and, as a result, it is difficult to form a crosslinked rubber having an appropriate degree of crosslinking and it is not possible to obtain a crosslinked rubber having excellent workability and heat resistance.

Examples of amine-based crosslinking agents having a melting point such as described above include, but are no specifically limited to, aliphatic polyvalent amines such as hexamethylenediamine carbamate (melting point: 155° C.) and hexamethylenediamine cinnamaldehyde adduct (melting point: 80° C.); aromatic polyvalent amines such as 2,2-bis[4-(4-aminophenoxy)phenyl]propane (melting point: 128° C.), 4,4'-methylenedianiline (melting point: 92° C.), m-phenylenediamine (melting point: 64° C.), p-phenylenediamine (melting point; 64° C.), and 4,4'-methylenebis(o-chloroaniline) (melting point: 102° C.); and compounds including at least two hydrazide structures such as adipic dihydrazide (melting point: 177° C.). Among these examples, hexamethylenediamine carbamate and 2,2-bis[4-(4-aminophenoxy)phenyl]propane are preferable as the amine-based crosslinking agent, and hexamethylenediamine carbamate is particularly preferable as the amine-based crosslinking agent from a viewpoint of ease of crosslinking, and also from a viewpoint of workability and heat resistance of the resultant crosslinked rubber. One amine-based crosslinking agent may be used individually, or two or more amine-based crosslinking agents may be used in combination.

The amount of the amine-based crosslinking agent that is compounded per 100 parts by mass of the rubber including the carboxyl group-containing ethylenically unsaturated monomer unit is preferably at least 0.1 parts by mass, more preferably at least 0.2 parts by mass, and even more preferably at least 0.5 parts by mass, and is preferably no greater than 10 parts by mass, more preferably no greater than 9 parts by mass, and even more preferably no greater than 8 parts by mass. An amount of the amine-based crosslinking agent of at least 0.1 parts by mass per 100 parts by mass of the rubber including the carboxyl group-containing ethylenically unsaturated monomer unit enables sufficient formation of a crosslinked structure in the crosslinked rubber and sufficient improvement of heat resistance of the crosslinked rubber. Moreover, an amount of the amine-based crosslinking agent of no greater than 10 parts by mass per 100 parts by mass of the rubber including the carboxyl group-containing ethylenically unsaturated monomer unit can inhibit both excessive hardness and reduced workability of the crosslinked rubber. Furthermore, the aforementioned amount can also inhibit bleed out of unreacted amine-based crosslinking agent from the crosslinked rubber.

<Carbon Nanotubes (CNTs)>

Single-walled carbon nanotubes and/or multi-walled carbon nanotubes can be used as the CNTs without any specific limitations. However, the CNTs are preferably carbon nanotubes having from 1 to 5 walls and are more preferably single-walled carbon nanotubes. When single-walled carbon nanotubes are used, heat resistance of the crosslinked rubber can be improved through a smaller additive amount of CNTs compared to a situation in which multi-walled carbon nanotubes are used. Consequently, heat resistance of the resultant crosslinked rubber can be sufficiently improved while inhibiting increased hardness (i.e., reduced workability) of the crosslinked rubber.

The average diameter (Av) of the CNTs is preferably at least 0.5 nm, and more preferably at least 1 nm, and is preferably no greater than 15 nm, and more preferably no greater than 10 nm. An average diameter (Av) for the CNTs of at least 0.5 nm can inhibit CNT aggregation and improve CNT dispersibility. Moreover, an average diameter (Av) for the CNTs of no greater than 15 nm enables sufficient improvement of heat resistance of the resultant crosslinked rubber.

The average length of a structure of the CNTs at the time of synthesis is preferably at least 100 μm and no greater than 5,000 μm.

Note that the average diameter (Av) and the average length of the CNTs can each be determined by measuring the diameter (external diameter) and length of 100 randomly selected carbon nanotubes using a transmission electron microscope.

Moreover, the average diameter (Av) and the average length of the CNTs may be adjusted by altering the production method and production conditions of the CNTs, or may be adjusted by combining a plurality of types of CNTs that are obtained by different methods.

The BET specific surface area of the CNTs is preferably at least 600 $m^2$/g, more preferably at least 700 $m^2$/g, and even more preferably at least 800 $m^2$/g, and is preferably no greater than 2,000 $m^2$/g, more preferably no greater than 1,800 $m^2$/g, and even more preferably no greater than 1,500 $m^2$/g. The BET specific surface area is preferably at least 1,300 $m^2$/g in a situation in which the CNTs are mainly open CNTs. A BET specific surface area for the CNTs of at least 600 $m^2$/g enables sufficient improvement of heat resistance of the resultant crosslinked rubber. Moreover, a BET specific surface area for the CNTs of no greater than 2,000 $m^2$/g can inhibit CNT aggregation and improve CNT dispersibility, and can also inhibit both excessive hardness and reduced workability of the crosslinked rubber.

According to a super growth method described below, the CNTs are obtained as an aggregate that is aligned in a perpendicular direction (aligned CNT aggregate) on a substrate having a catalyst layer for carbon nanotube growth on the surface thereof. The mass density of the CNTs in the form of the aforementioned aggregate is preferably at least 0.002 g/cm$^3$ and no greater than 0.2 g/cm$^3$. A mass density of no greater than 0.2 g/cm$^3$ enables homogeneous dispersion of the CNTs since binding between the CNTs is weak. Moreover, a mass density of at least 0.002 g/cm$^3$ makes the CNTs easier to handle by improving the unity of the CNTs and preventing the CNTs from becoming unbound.

CNTs having the properties described above can, for example, be produced by a method (super growth method; refer to WO 2006/011655 A1) in which, in synthesis of CNTs through chemical vapor deposition (CVD) by supplying a feedstock compound and a carrier gas onto a substrate having a catalyst layer for carbon nanotube production on the surface thereof, catalytic activity of the catalyst layer is dramatically improved by providing a trace amount of an oxidant (catalyst activating material) in the system. Hereinafter, carbon nanotubes that are obtained by the super growth method are also referred to as "SGCNTs".

The amount of the CNTs that is compounded per 100 parts by mass of the rubber including the carboxyl group-containing ethylenically unsaturated monomer unit is preferably at least 0.01 parts by mass, more preferably at least 0.1 parts by mass, even more preferably at least 1 part by mass, and particularly preferably at least 3 parts by mass, and is preferably no greater than 20 parts by mass, more preferably no greater than 15 parts by mass, and even more preferably no greater than 5 parts by mass. An amount of the CNTs of at least 0.01 parts by mass per 100 parts by mass of the rubber including the carboxyl group-containing ethylenically unsaturated monomer unit enables sufficient improvement of heat resistance of the crosslinked rubber. Moreover, an amount of the CNTs of no greater than 20 parts by mass per 100 parts by mass of the rubber including the carboxyl group-containing ethylenically unsaturated monomer unit can inhibit both excessive hardness and reduced workability of the crosslinked rubber.

<Compounding Agents>

Examples of compounding agents that may optionally be compounded into the crosslinkable rubber composition include crosslinking promotors, crosslinking aids, crosslinking retarders, reinforcing fillers (for example, carbon black and silica), non-reinforcing fillers (for example, calcium carbonate, clay, talc, and diatomite), plasticizers (for example, phthalic acid esters, dioctyl adipate, diisononyl adipate, di-n-alkyl adipates, dialkyl adipates, dioctyl azelate, dialkyl sebacates, dioctyl sebacate, trialkyl citrates, epoxidized unsaturated fatty acid esters, trimellitic acid esters, and polyether esters), anti-aging agents, antioxidants, light stabilizers, anti-scorch agents such as primary amines, processing aids, glidants, adhesives, lubricants, flame retardants, fungicides, acid acceptors, antistatic agents, magnetic compounds, and colorants. No specific limitations are placed on the amount of such compounding agents other than being in a range that does not impair the effects disclosed herein and the amount may be set in accordance the objective of compounding.

<Production Method of Crosslinkable Rubber Composition>

The crosslinkable rubber composition described above can be produced by mixing the rubber including the carboxyl group-containing ethylenically unsaturated monomer unit (hereinafter, also referred to simply as "the rubber"), the amine-based crosslinking agent having a melting point of at least 50° C. and no higher than 180° C., the one or more CNTs, and the optionally compounded compounding agents by a known method.

In a situation in which the rubber is prepared by emulsion polymerization and is obtained in a dispersed state in a dispersion medium such as water (latex state), the rubber is preferably solidified and dried by a known method before being kneaded with the amine-based crosslinking agent, the CNTs, and so forth. If the CNTs are mixed into the latex of the rubber dispersed in the dispersion medium of water or the like and are dispersed therein, it may be difficult to obtain a favorable dispersion state since insufficient shear force is applied.

Mixing of the rubber, the amine-based crosslinking agent, the CNTs, and the optional compounding agents may, for example, be carried out using a Banbury mixer or a roller. Specifically, the rubber, the amine-based crosslinking agent, the CNTs, and the optional compounding agents may, for example, be mixed by kneading the rubber, the CNTs, and the optional compounding agents, and subsequently adding the amine-based crosslinking agent and carrying out further kneading. Note that depending on the type, use, and so forth of the compounding agents, the compounding agents may alternatively be added after kneading of the rubber and the CNTs.

The CNTs generally have a high tendency to aggregate and tend to be difficult to disperse in the rubber. Therefore, in order to favorably disperse the CNTs in the rubber and obtain a crosslinked rubber having the intended performance, it is necessary to apply a large shear force during kneading of the rubber and the CNTs. Particularly in a situation in which the CNTs compounded with the rubber have a large BET specific surface area or in which a large amount of the CNTs is compounded with the rubber, it is necessary to apply a large shear force in order to inhibit aggregation of the CNTs and enable favorable dispersion of the CNTs. On the other hand, in a situation in which the rubber, the CNTs, and so forth are kneaded while applying a large shear force, the temperature of the crosslinkable rubber composition rises due to heat generation during shearing, which may have an undesired effect of causing a crosslinking reaction to proceed through the amine-based crosslinking agent. However, since the amine-based crosslinking agent used in the crosslinkable rubber composition according to the embodiment of the present disclosure has a melting point of at least the prescribed value, a crosslinkable rubber composition of the CNTs, the amine-based crosslinking agent, and so forth favorably dispersed in the rubber can be obtained while also inhibiting the crosslinking reaction from proceeding. Furthermore, the resultant crosslinkable rubber composition can be used to form a crosslinked rubber having excellent workability and heat resistance.

From a viewpoint of inhibiting the crosslinking reaction from proceeding during kneading, kneading of the rubber, the amine-based crosslinking agent, the CNTs, and the optional compounding agents is preferably carried out at a temperature that is lower than the melting point of the amine-based crosslinking agent, is more preferably carried out at no higher than 150° C., and is even more preferably carried out at no higher than 100° C. The kneading time is set as appropriate depending on the types and amounts of raw materials that are used and is normally at least 1 minute and no greater than 180 minutes.

(Crosslinked Rubber)

A crosslinked rubber according to the embodiment of the present disclosure is obtained through crosslinking of the crosslinkable rubber composition described above.

The method by which the crosslinkable rubber composition is crosslinked can be a known technique such as through the application of heat and pressure in a mold. The temperature during crosslinking of the crosslinkable rubber composition is normally at least 50° C. and no higher than 250° C., and is preferably at least as high as the melting point of the amine-based crosslinking agent. Moreover, the pressing pressure during crosslinking of the crosslinkable rubber composition is normally at least 1 MPa and no greater than 100 MPa.

The crosslinked rubber obtained through crosslinking of the crosslinkable rubber composition described above has excellent heat resistance and, for example, has a flow temperature Tf of preferably at least 330° C., more preferably at least 350° C., and even more preferably at least 385° C. Moreover, the crosslinked rubber has excellent workability and, for example, has a hardness of preferably no greater than 95, more preferably no greater than 90, and even more preferably no greater than 85. However, note that from a viewpoint of causing the crosslinked rubber to exhibit rubber elasticity, the hardness of the crosslinked rubber is preferably at least 20, more preferably at least 50, and even more preferably at least 60.

EXAMPLES

The following provides a more specific description of the present disclosure based on examples. However, the present disclosure is not limited to the following examples. In the following description, "%" and "parts" used to express quantities are by mass, unless otherwise specified.

In the following examples and comparative examples, the methods described below were used in order to measure and evaluate the iodine value and the polymer Mooney viscosity of rubbers, the BET specific surface area of carbon nanotubes, the melting point of crosslinking agents, and the flow temperature and hardness of crosslinked rubbers.

<Iodine Value>

The iodine value of each rubber was measured in accordance with JIS K6235.

<Polymer Mooney Viscosity>

The Mooney viscosity ($ML_{1+4}$, 100° C.) of each rubber was measured in accordance with JIS K6300-1.

<BET Specific Surface Area>

The BET specific surface area of CNTs was measured in accordance with JIS Z8830 using a BET specific surface area measuring device (HM model-1210 produced by Mountech Co., Ltd.)

<Melting Point>

The melting point of each crosslinking agent was measured in accordance with JIS K0064. An MP-21 produced by Yamato Scientific Co., Ltd. was used as a measurement device, and a glass capillary tube loaded with the solid crosslinking agent was immersed in silicone oil and the melting point was measured visually.

<Flow Temperature>

The flow temperature Tf of each crosslinked rubber was evaluated using a thermomechanical analysis (TMA) device (TMA/SS6100 produced by Seiko Instruments Inc.).

Specifically, a specimen having dimensions of 0.5 cm×0.5 cm and a thickness of 0.2 cm was cut from a resultant crosslinked rubber. A TMA curve (horizontal axis: temperature, vertical axis: deformation) was measured with respect to the specimen by applying a load in a thickness direction of the specimen in accordance with JIS K7197. Measurement was carried out in a nitrogen atmosphere by a compression mode. A heating rate of 10° C. per minute and a load of 1.0 N were used.

The flow temperature Tf of the crosslinked rubber was calculated as follows. Specifically, a temperature at which the deformation reached a maximum on the determined TMA curve (horizontal axis: temperature, vertical axis: deformation) was taken to be Tmax. The flow temperature Tf was determined to be the temperature of an intersection point between a tangent to the TMA curve at a temperature 5° C. lower than Tmax (i.e., Tmax−5° C.) and a tangent to the TMA curve at a temperature 2° C. higher than Tmax (i.e., Tmax+2° C.).

<Hardness>

The hardness of each crosslinked rubber was measured in accordance with JIS K6253 using a type A durometer.

Example 1

<Synthesis of Hydrogenated Carboxylated Nitrile Rubber (HXNBR)>

A metal bottle was charged with 180 parts of deionized water, 25 parts of a sodium dodecylbenzenesulfonate aqueous solution of 10% in concentration, 35 parts of acrylonitrile as an α,β-ethylenically unsaturated nitrile monomer, 6 parts of mono-n-butyl maleate as a carboxyl group-containing ethylenically unsaturated monomer, and 0.5 parts of t-dodecyl mercaptan (molecular weight modifier), in order. Gas inside of the metal bottle was purged three times with nitrogen and 59 parts of 1,3-butadiene was subsequently added as a conjugated diene monomer. Thereafter, the metal bottle was maintained at 5° C. and 0.1 parts of cumene hydroperoxide (polymerization initiator) was added thereto. Polymerization was carried out for 16 hours while rotating the metal bottle. Next, 0.1 parts of a hydroquinone aqueous solution (polymerization terminator) of 10% in concentration was added to terminate the polymerization reaction. Thereafter, a rotary evaporator having a water temperature of 60° C. was used to remove residual monomers and thereby obtain a latex of a carboxylated nitrile rubber (solid content concentration approximately 30%).

Next, a palladium catalyst (solution obtained by mixing 1% palladium acetate acetone solution with deionized water of equivalent weight) was added to the produced latex in an autoclave in an amount such that the palladium content relative to the dry weight of the rubber contained in the resultant latex was 1,000 ppm. A hydrogenation reaction was carried out for 6 hours at a hydrogen pressure of 3 MPa and a temperature of 50° C. to obtain a latex of a hydrogenated carboxylated nitrile rubber.

Finally, two volume equivalents of methanol were added to the resultant latex of the hydrogenated carboxylated nitrile rubber to cause solidification, the solid product (crumb) was subsequently removed by filtration, and the filtered off solid product was vacuum dried for 12 hours at 60° C. to obtain the hydrogenated carboxylated nitrile rubber (HXNBR). The resultant hydrogenated carboxylated nitrile rubber (HXNBR) had an iodine value of 11 and a Mooney viscosity of 45 as measured by the previously described methods.

With respect to the resultant hydrogenated carboxylated nitrile rubber (HXNBR), the amount of a mono-n-butyl maleate unit that was included in the rubber as the carboxyl group-containing ethylenically unsaturated monomer unit was confirmed by the following procedure. Specifically, a 0.2 g sample in the form of an approximately 2 mm square was cut from the resultant rubber and was stirred for 4 hours with 100 mL of 2-butanol. Thereafter, 20 mL of ethanol and 10 mL of water were added. Next, the number of moles of carboxyl groups relative to 100 g of the rubber was determined by titration under stirring at room temperature using a 0.02N hydrous ethanol solution of potassium hydroxide with thymolphthalein as an indicator. The determined number of moles was converted to an amount of mono-n-butyl maleate and it was found that the amount of the mono-n-butyl maleate unit in the rubber was 6%.

<Production of Crosslinkable Rubber Composition>

A Banbury mixer was used to knead 100 parts of the resultant hydrogenated carboxylated nitrile rubber (HXNBR), 5 parts of multi-walled carbon nanotubes (MWCNTs), and 1 part of stearic acid and 1 part of polyoxyethylene stearyl ether phosphoric acid (product name: Phosphanol RL-210, produced by TOHO Chemical Industry Co., Ltd.) as processing aids in accordance with the amounts shown in Table 1. The multi-walled carbon nanotubes (MWCNTs) were the product "NC7000" produced by Nanocyl SA (BET specific surface area: 256 $m^2/g$, average diameter (Av): 9.5 nm, average length: 1.5 μm).

Next, the resultant kneaded product was transferred to a roller and was further kneaded with 2.4 parts of hexamethylenediamine carbamate (HMDAC; melting point: 155° C., product name: DIAK #1, produced by DuPont Dow Elastomers), added as an amine-based crosslinking agent, to obtain a crosslinkable rubber composition. The temperature of the crosslinkable rubber composition during kneading was no higher than 100° C.

<Production of Crosslinked Rubber>

The resultant crosslinkable rubber composition was loaded into a mold of 15 cm in length, 15 cm in width, and 0.2 cm in depth, and was press molded for 20 minutes at 170° C. while applying a pressing pressure of 10 MPa to obtain a sheet-shaped crosslinked product. Next, the resultant crosslinked product was transferred to a Geer oven and secondary crosslinking was carried out for 4 hours at 170° C. to obtain a crosslinked rubber.

The flow temperature Tf and hardness of the resultant crosslinked rubber were evaluated and measured. The results are shown in Table 1.

Examples 2-4

Crosslinkable rubber compositions and crosslinked rubbers were produced in the same way as in Example 1 with the exception that in production of the crosslinkable rubber compositions, single-walled carbon nanotubes (SWCNTs-1, SWCNTs-2, SWCNTs-3) were used instead of the MWCNTs. The flow temperature Tf and hardness were evaluated and measured in the same way as in Example 1. The results are shown in Table 1.

SWCNTs-1 used as the single-walled carbon nanotubes were the product "HiPco®" (HiPco is a registered trademark in Japan, other countries, or both) produced by NanoIntegris Inc. (BET specific surface area: 512 $m^2/g$, average diameter (Av): 1.1 nm, average length: 3.0 μm).

SWCNTs-2 and SWCNTs-3 used as the single-walled carbon nanotubes were SGCNTs produced by the super growth method. The SWCNTs-2 had a BET specific surface area of 706 $m^2/g$, an average diameter (Av) of 3.8 nm, and an average length of 2,500 μm. The SWCNTs-3 had a BET specific surface area of 865 $m^2/g$, an average diameter (Av) of 3.4 nm, and an average length of 2,350 μm.

Examples 5 and 6

Crosslinkable rubber compositions and crosslinked rubbers were produced in the same way as in Example 4 with the exception that in production of the crosslinkable rubber compositions, the amount of the SWCNTs-3 was changed to the amounts shown in Table 1. The flow temperature Tf and hardness were evaluated and measured in the same way as in Example 1. The results are shown in Table 1.

Example 7

A crosslinkable rubber composition and a crosslinked rubber were produced in the same way as in Example 1 with the exception that in production of the crosslinkable rubber composition, 1 part of single-walled carbon nanotubes (SWCNTs-4) was used instead of 5 parts of the MWCNTs. The flow temperature Tf and hardness were evaluated and measured in the same way as in Example 1. The results are shown in Table 1.

SWCNTs-4 used as the single-walled carbon nanotubes were SGCNTs produced by the super growth method. The SWCNTs-4 had a BET specific surface area of 1,756 $m^2/g$, an average diameter (Av) of 2.2 nm, and an average length of 2,580 μm.

Example 8

A crosslinkable rubber composition and a crosslinked rubber were produced in the same way as in Example 4 with the exception that in production of the crosslinkable rubber composition, 6.7 parts of 2,2-bis[4-(4-aminophenoxy)phenyl]propane (BAPOPP; melting point: 128° C., produced by Wakayama Seika Kogyo Co., Ltd.) was used as the amine-based crosslinking agent instead of 2.4 parts of hexamethylenediamine carbamate (HMDAC). The flow temperature Tf and hardness were evaluated and measured in the same way as in Example 1. The results are shown in Table 1.

Example 9

A crosslinkable rubber composition and a crosslinked rubber were produced in the same way as in Example 1 with the exception that in production of the crosslinkable rubber composition, 100 parts of a carboxylated acrylic rubber (XACM) synthesized as described below was used instead of 100 parts of the hydrogenated carboxylated nitrile rubber (HXNBR) and the amounts of the MWCNTs and hexamethylenediamine carbamate (HMDAC) were changed as shown in Table 1. The flow temperature Tf and hardness were evaluated and measured in the same way as in Example 1. The results are shown in Table 1.

<Synthesis of Carboxylated Acrylic Rubber (XACM)>

A polymerization reaction vessel equipped with a thermometer and a stirring device was charged with 200 parts of deionized water, 3 parts of sodium lauryl sulfate, 49 parts of ethyl acrylate and 49 parts of n-butyl acrylate as (meth) acrylic acid ester monomers, and 2 parts of monomethyl fumarate as a carboxyl group-containing ethylenically unsaturated monomer. Next, reduced pressure degassing and nitrogen purging were carried out twice to sufficiently remove oxygen from the vessel. Thereafter, 0.005 parts of cumene hydroperoxide and 0.002 parts of sodium formaldehyde sulfoxylate were added into the vessel, emulsion polymerization was initiated at 30° C. under normal pressure, and a reaction was carried out until the polymerization conversion rate reached 95%. The resultant latex was solidified using calcium chloride aqueous solution, was washed with water, and was dried to obtain the carboxylated acrylic rubber (XACM). The resultant carboxylated acrylic rubber (XACM) had a Mooney viscosity of 35 as measured by the previously described method.

With respect to the resultant carboxylated acrylic rubber (XACM), the amount of a monomethyl fumarate unit included in the rubber as the carboxyl group-containing ethylenically unsaturated monomer unit was confirmed by the following procedure. Specifically, a 0.2 g sample in the form of an approximately 2 mm square was cut from the resultant rubber and was stirred for 4 hours with 100 mL of 2-butanol. Thereafter, 20 mL of ethanol and 10 mL of water were added. Next, the number of moles of carboxyl groups relative to 100 g of the rubber was determined by titration under stirring at room temperature using a 0.02N hydrous ethanol solution of potassium hydroxide with thymolphthalein as an indicator. The determined number of moles was converted to an amount of monomethyl fumarate and it was found that the amount of the monomethyl fumarate unit in the rubber was 2%

Examples 10-12

Crosslinkable rubber compositions and crosslinked rubbers were produced in the same way as in Example 9 with the exception that in production of the crosslinkable rubber compositions, single-walled carbon nanotubes (SWCNTs-3) were used in the amounts shown in Table 1 instead of the MWCNTs. The flow temperature Tf and hardness were evaluated and measured in the same way as in Example 1. The results are shown in Table 1.

Comparative Example 1

A crosslinkable rubber composition and a crosslinked rubber were produced in the same way as in Example 1 with the exception that in production of the crosslinkable rubber composition, 8.0 parts of a peroxide, 1,3-bis(t-butylperoxy-isoproyl)benzene (BIBP; produced by Hercules Inc.), was used instead of 2.4 parts of hexamethylenediamine carbamate (HMDAC). The flow temperature Tf and hardness were evaluated and measured in the same way as in Example 1. The results are shown in Table 1.

Comparative Example 2

A crosslinkable rubber composition and a crosslinked rubber were produced in the same way as in Example 1 with the exception that in production of the crosslinkable rubber composition, a hydrogenated nitrile rubber that did not include a carboxyl group-containing ethylenically unsaturated monomer unit (HNBR; produced by ZEON Corporation, product name: Zetpol® 2010L (Zetpol is a registered trademark in Japan, other countries, or both), iodine value 11, Mooney viscosity ($ML_{1-4}$, 100° C.) 57.5) was used instead of 100 parts of the hydrogenated carboxylated nitrile rubber (HXNBR). The flow temperature Tf and hardness were evaluated and measured in the same way as in Example 1. The results are shown in Table 1.

Comparative Example 3

A crosslinkable rubber composition and a crosslinked rubber were produced in the same way as in Example 1 with the exception that in production of the crosslinkable rubber composition, 1,5-diaminonaphthalene (DAN; melting point: 190° C., produced by Tokyo Chemical Industry Co., Ltd.) was used as the amine-based crosslinking agent instead of hexamethylenediamine carbamate (HMDAC). The flow temperature Tf and hardness were evaluated and measured in the same way as in Example 1. The results are shown in Table 1.

Comparative Example 4

A crosslinkable rubber composition and a crosslinked rubber were produced in the same way as in Example 1 with the exception that in production of the crosslinkable rubber composition, 1,3-diaminopropane (DAP; melting point: 49° C., produced by Tokyo Chemical Industry Co., Ltd.) was used as the amine-based crosslinking agent instead of hexamethylenediamine carbamate (HMDAC). The flow temperature Tf and hardness were evaluated and measured in the same way as in Example 1. The results are shown in Table 1.

It should be noted that in Comparative Example 4, a crosslinking reaction proceeded through the 1,3-diaminopropane (DAP) during kneading using the roller, leading to uneven crosslinking in the crosslinked rubber.

TABLE 1

| | | | Example 1 | Example 2 | Example 3 | Example 4 | Example 5 | Example 6 | Example 7 | Example 8 |
|---|---|---|---|---|---|---|---|---|---|---|
| Cross linkable rubber composition | Rubber | Type | HXNBR | HXNBR | HXNBR | HXNBR | HXNBR | HXNBR | HXNBR | HXNBR |
| | | Amount [parts by mass] | 100 | 100 | 100 | 100 | 100 | 100 | 100 | 100 |
| | CNTs | Type | MWCNTs | SWCNTs-1 | SWCNTs-2 | SWCNTs-3 | SWCNTs-3 | SWCNTs-3 | SWCNTs-4 | SWCNTs-3 |
| | | BET specific surface area [$m^2$/g] | 256 | 512 | 706 | 865 | 865 | 865 | 1756 | 865 |
| | | Amount [parts by mass] | 5 | 5 | 5 | 5 | 1 | 3 | 1 | 5 |
| | Cross linking agent | Type | HMDAC | HMDAC | HMDAC | HMDAC | HMDAC | HMDAC | HMDAC | BAPOPP |
| | | Melting point [° C.] | 155 | 155 | 155 | 155 | 155 | 155 | 155 | 128 |
| | | Amount [parts by mass] | 2.4 | 2.4 | 2.4 | 2.4 | 2.4 | 2.4 | 2.4 | 6.7 |
| Evaluation | | Flow temperature Tf [° C.] | 378 | 380 | 392 | 404 | 378 | 393 | 390 | 390 |
| | | Hardness | 70 | 69 | 72 | 84 | 65 | 77 | 70 | 82 |

| | | | Example 9 | Example 10 | Example 11 | Example 12 | Comparative Example 1 | Comparative Example 2 | Comparative Example 3 | Comparative Example 4 |
|---|---|---|---|---|---|---|---|---|---|---|
| Cross linkable rubber composition | Rubber | Type | XACM | XACM | XACM | XACM | HXNBR | HNBR | HXNBR | HXNBR |
| | | Amount [parts by mass] | 100 | 100 | 100 | 100 | 100 | 100 | 100 | 100 |
| | CNTs | Type | MWCNTs | SWCNTs-3 | SWCNTs-3 | SWCNTs-3 | MWCNTs | MWCNTs | MWCNTs | MWCNTs |
| | | BET specific surface area [$m^2$/g] | 256 | 865 | 865 | 865 | 256 | 256 | 256 | 256 |
| | | Amount [parts by mass] | 1 | 1 | 3 | 5 | 5 | 5 | 5 | 5 |

TABLE 1-continued

| | | | | | | | | | | |
|---|---|---|---|---|---|---|---|---|---|---|
| | Cross linking agent | Type | HMDAC | HMDAC | HMDAC | HMDAC | BIBP | HMDAC | DAN | DAP |
| | | Melting point [° C.] | 155 | 155 | 155 | 155 | — | 155 | 190 | 49 |
| | | Amount [parts by mass] | 0.6 | 0.6 | 0.6 | 0.6 | 8.0 | 2.4 | 2.4 | 2.4 |
| Evaluation | | Flow temperature Tf [° C.] | 328 | 335 | 338 | 340 | 302 | 218 | 221 | 225 |
| | | Hardness | 25 | 33 | 53 | 64 | 69 | 68 | 68 | 69 |

It can be seen from Table 1 that it was possible to improve heat resistance while maintaining sufficient workability for the crosslinked rubbers of Examples 1-12, in which a rubber including a carboxyl group-containing ethylenically unsaturated monomer unit, an amine-based crosslinking agent having a melting point of at least 50° C. and no greater than 180° C., and carbon nanotubes were used, compared to the crosslinked rubber of Comparative Example 1, in which an amine-based crosslinking agent was not used, the crosslinked rubber of Comparative Example 2, in which a rubber including a carboxyl group-containing ethylenically unsaturated monomer unit was not used, and the crosslinked rubbers of Comparative Examples 3 and 4, in which an amine-based crosslinking agent having a melting point of lower than 50° C. or higher than 180° C. was used.

Examples 1-7 and 9-12 in Table 1 demonstrate that heat resistance of a crosslinked rubber can be further improved by using single-walled CNTs, and in particular by using single-walled CNTs having a large BET specific surface area. Moreover, Examples 4-6 and 10-12 and Comparative Example 4 demonstrate that when an amine-based crosslinking agent having a melting point of at least 50° C. is used, even if a large amount of CNTs having a large BET specific surface area and a high tendency to aggregate are used, crosslinking can be inhibited from proceeding during kneading while also favorably dispersing the CNTs during kneading so that a crosslinked rubber having excellent workability and heat resistance can be obtained.

Furthermore, Examples 4 and 8 in Table 1 demonstrate that crosslinking can be inhibited from proceeding during kneading so that a crosslinked rubber having excellent workability and heat resistance is obtained by altering the melting point of the amine-based crosslinking agent that is used.

INDUSTRIAL APPLICABILITY

According to the present disclosure, it is possible to provide a crosslinked rubber having excellent workability and heat resistance, and a crosslinkable rubber composition that can be used to form the crosslinked rubber.

The invention claimed is:

1. A crosslinkable rubber composition consisting of:
  a rubber including a carboxyl group-containing ethylenically unsaturated monomer unit;
  an amine-based crosslinking agent having a melting point of at least 50° C. and no higher than 180° C.;
  one or more carbon nanotubes; and
  at least one compounding agent selected from a group consisting of reinforcing fillers, calcium carbonate, clay, talc, diatomite, anti-aging agents, stearic acid, polyoxyethylene stearyl ether phosphoric acid, flame retardants, and colorants, wherein
  the rubber is a carboxylated nitrile rubber or a hydrogenated carboxylated nitrile rubber obtained through hydrogenation of the carboxylated nitrile rubber, and
  the carboxylated nitrile rubber consists of at least 0.1 mass % and no greater than 20 mass % of a carboxyl group-containing ethylenically unsaturated monomer unit, at least 5 mass % and no greater than 60 mass % of an α,β-ethylenically unsaturated nitrile monomer unit, at least 20 mass % and no greater than 89.5 mass % of a diene monomer unit and less than 50 mass % of another monomer unit selected from a group consisting of alkyl (meth)acrylate unit, aromatic vinyl monomer unit, fluorine-containing vinyl monomer unit and copolymerizable anti-aging agent unit.

2. The crosslinkable rubber composition of claim 1, wherein
  the carbon nanotubes have a BET specific surface area of at least 600 m²/g and no greater than 2,000 m²/g.

3. A crosslinked rubber obtained through crosslinking of the crosslinkable rubber composition of claim 1.

4. The crosslinked rubber of claim 3 having a flow temperature Tf of at least 330° C. and a hardness of at least 20 and no greater than 95.

* * * * *